United States Patent Office 3,546,483
Patented Dec. 8, 1970

3,546,483
CONTROL CIRCUITRY FOR A TRANSFORMER SUPPLIED UNIDIRECTIONALLY-CONDUCTIVE LOAD
Robert S. Lundin, Thomaston, Conn., assignor to General Time Corporation, Stamford, Conn., a corporation of Delaware
Filed Apr. 26, 1967, Ser. No. 633,985
Int. Cl. H03k 17/00
U.S. Cl. 307—252                                    3 Claims

ABSTRACT OF THE DISCLOSURE

A circuit for supplying a unidirectionally-conductive load through a transformer. A controlled rectifier gates current to a transformer primary winding from an AC source, driving the transformer core toward saturation in one direction, and supplying current to a unidirectionally-conductive load through the transformer secondary winding. A diode shunts the controlled rectifier and is oppositely poled with respect thereto, to pass the necessary current for resetting the transformer core toward opposite saturation during the half-cycles when the unidirectionally-conductive load is not conducting. A current limiting resistor may be connected in series with the diode to limit current during certain operating conditions.

RELATED APPLICATION

Figure 1:
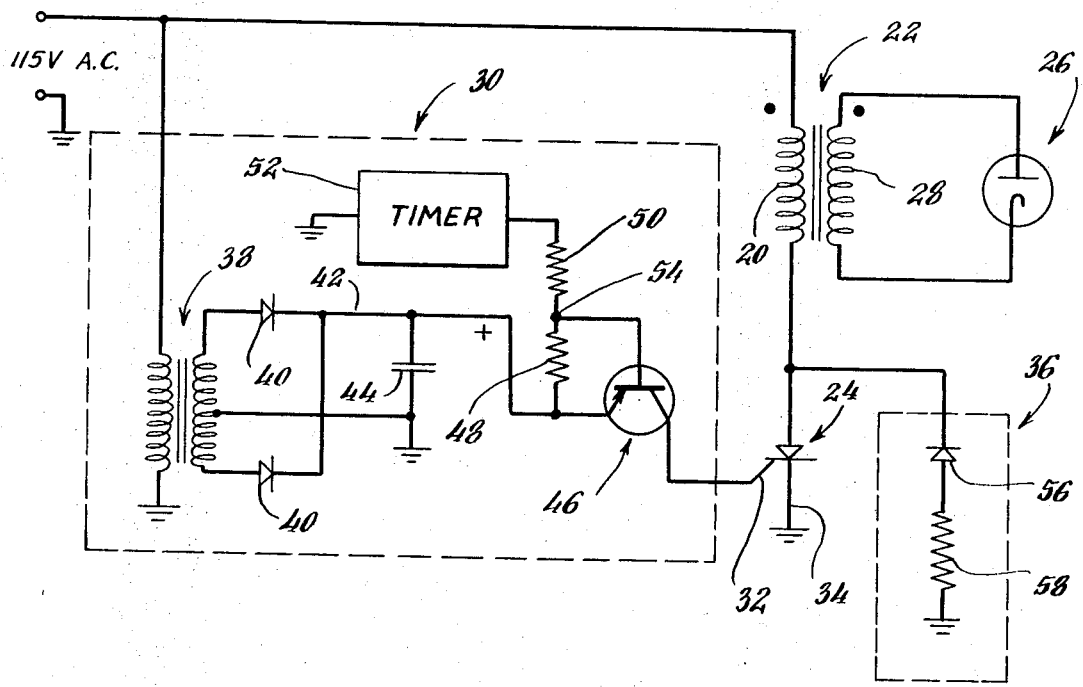

The timer disclosed in the present application may be used with the electronic timer disclosed and claimed in Klaus D. Wallentowitz' co-pending application, Ser. No. 405,503, filed Oct. 21, 1964, now Pat. No. 3,213,452, entitled "Electronic Timer Circuit." That application is assigned to the same assignee as the present invention and is incorporated herein by reference.

BACKGROUND OF THE INVENTION

It is known to control the current to a load by a pair of oppositely poled controlled rectifiers, in applications requiring full-wave alternating current in the load. Typical prior art practice is exemplified by U.S. Pat. No. 3,155,777 to Owen. Such circuits are somewhat complex, since separate and isolated control or gating signals for controlling conduction of the controlled rectifiers must be provided, i.e., the two control signals cannot be referenced to a common point of potential. These circuits therefore require not only two controlled rectifiers but means for providing two isolated gating signals. Applicant has discovered that in the case where a unidirectionally-conductive load is supplied through a transformer, control of the current in the load may be accomplished using a single controlled rectifier by providing means for resetting the transformer core during the power supply half-cycles when the load is not conductive. This is readily accomplished in applicant's preferred embodiment by an oppositely poled diode connected in parallel with the controlled rectifier. Applicant's circuit thus permits the use of only a single controlled rectifier and a single gating signal source.

SUMMARY OF THE INVENTION

A primary object is to provide a circuit for controlling current through a transformer to a unidirectionally-conductive load.

A further object is to provide a circuit of the above character which requires only a single controlled rectifier.

A further object is to provide a circuit of the above character which requires only a single gating source for the controlled rectifier.

A further object is to provide a circuit of the above character including means for resetting the transformer core on each power supply half-cycle when the unidirectionally-conducting load is non-conductive.

A further object is to provide a circuit of the above character in which core resetting is accomplished by a reversely poled diode connected in parallel with the controlled rectifier.

Other objects of the invention will in part be obvious and will in part appear hereinafter.

The invention accordingly comprises the features of construction, combinations of electrical elements, and electrical circuit arrangements which will be exemplified in the electronic control circuit herein disclosed. The scope of the invention is indicated in the claims.

In general, the present invention comprises a unidirectionally-conducting load energized through a transformer from an alternating current source. A controlled rectifier is connected in series with the primary winding of the transformer, and is poled to permit conduction through the primary winding on the appropriate power supply half-cycles to cause conduction in the transformer secondary winding and in the unidirectionally-conducting load. Conduction in the controlled rectifier is selectively controlled by a gating signal circuit, while proper operation of the transformer is assured by a transformer-resetting circuit including a diode connected in parallel with and oppositely poled with respect to the controlled rectifier.

THE DRAWING

Figure 2:
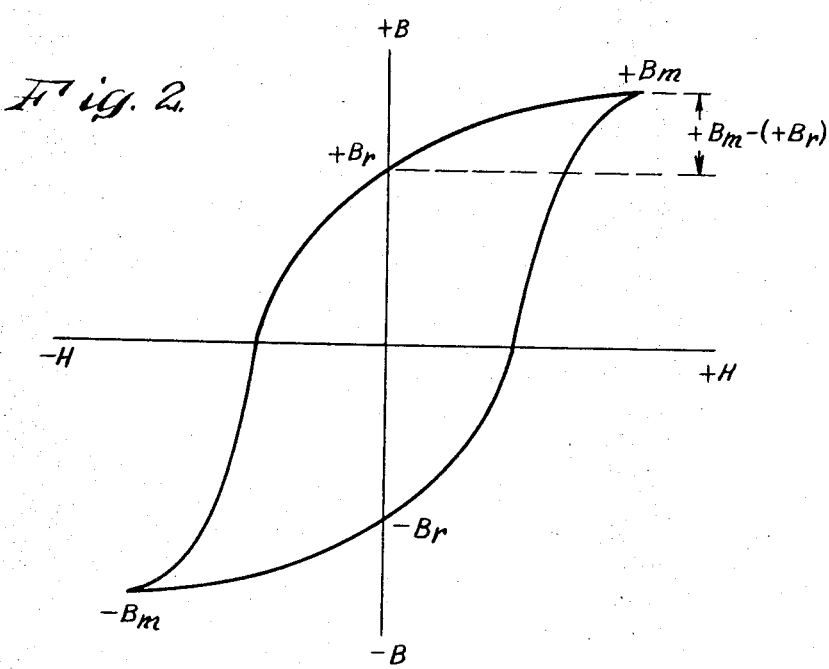

For a more complete understanding of the nature and objects of the invention, reference should be had to the following detailed description taken in connection with the accompanying drawing, in which:

FIG. 1 is a schematic circuit diagram of the preferred embodiment of a control circuit according to the invention; and FIG. 2 is a graph of the characteristics of a transformer core, used to explain the operation of the FIG. 1 embodiment.

SPECIFIC DESCRIPTION

As shown in FIG. 1, primary winding 20 of transformer 22 has a first end terminal connected to one side of an AC source, and its opposite end terminal connected through the anode-cathode path of a controlled rectifier (illustrated as SCR 24) to the remaining side of the AC source, illustrated for convenience as a point of common or reference potential. It should be understood that the point of reference potential is not necessarily a chassis or earth ground, but may be merely a common circuit point or conductor. A unidirectionally-conducting load impedance 26 is connected across secondary winding 28 of transformer 22, and may, for example, be an X-ray tube. A gating signal source 30 provides on gate electrode 32 a positive gate signal with respect to cathode 34, to permit conduction through SCR 24. A resetting circuit 36 shunts SCR 24 to permit proper operation of transformer 22, as will be explained.

The gating signal source 30 is exemplary and need not be described in detail. However, source 30 includes a transformer 38 having a primary winding connected across the AC power supply terminals, and having a center-tapped secondary winding. The center tap is connected to the point of reference potential, while diodes 40 form a full-wave rectifier connecting the opposite ends of the secondary winding to positive bias conductor 42. Capacitor 44 provides filtration to smooth out ripple appearing on conductor 42. A PNP transistor 46 has its emitter electrode connected to conductor 42 and its collector electrode connected to gate electrode 32.

A pair of serially connected resistors 48 and 50 connect conductor 42 through timer 52 to the point of reference potential, so that timer 52 can selectively make point 54 between resistors 48 and 50 more negative than conductor 42. The base electrode of transistor 46 is connected to point 54. Thus, timer 52 can selectively bias the base electrode of transistor 46 more negative than the emitter electrode thereof, rendering transistor 46 conductive and applying the positive potential on conductor 42 to gate electrode 32 as a gating signal. Timer 52 may be of any suitable construction, such as that disclosed in U.S. patent application Ser. No. 405,503, filed Oct. 21, 1964, by K. Wallentowitz, and assigned to the assignee of the present invention. It should be understood that the details of the specifically disclosed gating source 30 are not critical to the invention, and that other gating sources may be substituted therefor.

According to the present invention, proper operation and control of transformer 22 by a single SCR 24 is permitted by resetting circuit 36. In order to explain the problems solved by circuit 36, reference is now made to FIG. 2, which is a generalized magnetization curve of the core of transformer 22, and is somewhat exaggerated for purposes of illustration. It is assumed that the circuit has just been energized, and that resetting circuit 36 is not connected. Referring again to FIG. 1, when SCR 24 fires on positive half-cycles of the power supply voltage, current flows through primary winding 20, driving the core of transformer 22 toward positive saturation (to point $+Bm$ in FIG. 2) and inducing a current flow in the secondary winding 28 through load 26. When the power supply voltage drops to zero, removing the coercive force H, the flux in the core returns only to point $+Br$. When the power supply is negative, no current flows through the SCR 24, so there would be no negative coercive force (in the absence of a path around SCR 24 such as is provided by applicant's circuit 36) for resetting the core to a point of less positive remanence. Accordingly, when SCR 24 next fires, the core of transformer 22 could only be driven a distance equal to $+Bm-(+Br)$. It should be understood that this distance is exaggerated in FIG. 2 for clarity of illustration, and that in an actual transformer there would be only a relatively small flux change in the transformer core resulting in a small induced signal in secondary winding 28 rather than the desired value.

Circuit 36 takes advantage of the unidirectionally-conductive character of load 26 and provides a bypass around SCR 24 during negative half-cycles of the power supply voltage. This permits current to flow through primary winding 20 to provide a negative coercive force for at least partially resetting the core of transformer 22 to a point of less positive remanence than point $+Br$ in FIG. 2. As illustrated, circuit 36 includes as an essential element a rectifying diode 56 (e.g., a two-layer rectifier without a third or control electrode). Since load impedance 26 can conduct only in one direction, flow of the resetting current through primary winding 20 during the negative half-cycles of the power supply voltage is accomplished without any loss of control over the current flow in load 26.

A limiting means such as resistor 58 may be provided in series with diode 56 to limit the current through diode 56 and winding 20 to a safe level during negative half-cycles of the power supply voltage. Provision of such limiting means is particularly important when the core of transformer 22 is at or near negative saturation, as would occur when SCR 24 has not fired due to absence of a gating signal on gate 32. Under these conditions, the core of transformer 22 would remain near negative saturation and primary winding 20 would present a very low impedance. Resistor 58 prevents excessive current flow under such conditions.

Under some operating conditions, it may be desirable to provide a further resistor and diode across primary winding 20, with the diode poled for conduction in the same direction as is SCR 24. This further diode and resistor aids in suppressing transient voltages caused by abrupt flux changes in the core of transformer 22 as will be apparent to those skilled in the art.

It may be seen from the above description and the accompanying drawing that the present invention provides control of current supplied to a unidirectionally-conductive load through a transformer, using only a single controlled rectifier 24 in series with the transformer primary winding 20. This permits use of only one gating signal source 30.

It will thus be seen that the objects set forth above, among those made apparent from the preceding description, are efficiently attained, and since certain changes may be made in the above circuit without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention, which, as a matter of language might be said to fall therebetween.

Having described my invention, what I claim as new and desire to secure by Letters Patent is:

1. Control circuitry for controlling the current supplied through a transformer to a unidirectionally-conductive load comprising a transformer having a magnetic core and having primary and secondary windings, a unidirectionally-conductive load impedance connected across said secondary winding, means including a single controlled rectifier for connecting an alternating-current power supply in series with said primary winding, said controlled rectifier being poled to permit, during power supply half-cycles of given polarity, current flow through said transformer and said unidirectionally-conductive load, and reset means for resetting said transformer during all power supply half-cycles of opposite polarity, said reset means comprising a diode connected in parallel with said controlled rectifier and poled in the opposite direction therefrom.

2. The circuitry defined in claim 1, further comprising a resistor in series with said diode for limiting current flow therethrough.

3. The circuitry defined in claim 1, wherein said diode is a two-layer solid-state rectifier.

References Cited

UNITED STATES PATENTS 3,413,559  11/1968  Jorgenson et al. _____ 328—268
3,431,436   3/1969  King _____ 307—252

DONALD D. FORRER, Primary Examiner

J. D. FREW, Assistant Examiner

U.S. Cl. X.R.

219—10.55; 307—284, 305